United States Patent [19]
Ueda et al.

[11] Patent Number: 5,612,437
[45] Date of Patent: Mar. 18, 1997

[54] POLYMERIZATION APPARATUS AND METHOD OF PRODUCING VINYL CHLORIDE TYPE POLYMER BY USING THE SAME

[75] Inventors: Takuya Ueda, Kamisu-machi; Kikuo Nakajima, Hasaki-machi; Yoichi Tanifuji, Kamisu-machi; Tadashi Amano, Kamisu-machi; Shuji Ohnishi, Kamisu-machi, all of Japan

[73] Assignee: Shin-Etsu Chemical Co., Ltd., Tokyo, Japan

[21] Appl. No.: 364,449

[22] Filed: Dec. 27, 1994

[30] Foreign Application Priority Data

Dec. 27, 1993 [JP] Japan ..................... 5-351850

[51] Int. Cl.⁶ .................................................. C08F 2/18
[52] U.S. Cl. ......................... 526/344.2; 526/345
[58] Field of Search ........................ 526/344.2, 345

[56] References Cited

U.S. PATENT DOCUMENTS 2,459,636  4/1945  Fenney ........................ 260/683.4
3,931,131  1/1976  Noziri et al. ..................... 526/62

FOREIGN PATENT DOCUMENTS 1176160  4/1959  France .
4041500A1  6/1992  Germany ................. C07D 251/10
2036763  11/1979  United Kingdom .......... C08F 2/18

Primary Examiner—Thomas R. Weber
Attorney, Agent, or Firm—Sughrue, Mion, Zinn, Macpeak & Seas

[57] ABSTRACT

A vinyl chloride polymer is produced by subjecting vinyl chloride or a monomer mixture made up mainly of vinyl chloride to suspension polymerization in an aqueous medium using a polymerization apparatus equipped with a polymerization vessel. The polymerization apparatus used comprises a polymerization vessel (1) having a substantially cylindrical inner space, said inner space of said polymerization vessel being provided with a plurality of baffles (5) comprising vertically extending pipes, and serpentine pipelines (6) each of which is placed between two adjacent baffles and is extended in a serpentine fashion along the polymerization vessel inner wall from the lower part to the upper part of the polymerization vessel, and a refrigerant being passed through said baffles and said serpentine pipelines. High-cooling performance can be obtained, a high-speed reaction in a large-sized polymerization vessel becomes possible, and a stable polymerization reaction can be carried out. A high-quality and uniform polymer that has few fish eyes and has a high bulk specific gravity can be obtained.

10 Claims, 4 Drawing Sheets

POLYMERIZATION APPARATUS AND METHOD OF PRODUCING VINYL CHLORIDE TYPE POLYMER BY USING THE SAME

BACKGROUND OF THE INVENTION

1. Field of the Invention

The present invention relates to a novel polymerization apparatus improved in heat dissipation ability.

2. Description of the Prior Art

Conventionally, as polymerization apparatuses used in suspension polymerization or the like of a vinyl chloride type monomer, for example, polymerization apparatuses are known that comprise a polymerization vessel equipped with a reflux condenser, a cooling jacket, an agitator, a nozzle through which raw materials are charged, a nozzle through which the polymer is withdrawn, and the like. In these polymerization apparatuses, the removal of heat (dissipation of heat) of polymerization is effected mainly through said reflux condenser and jacket.

Further, as polymerization apparatuses that adopt other heat dissipation system, there are also known a polymerization apparatus comprising a polymerization vessel with a cooling coil, a draft tube, and the like attached thereto and a polymerization apparatus having a cooling apparatus outside thereof wherein the polymerization reaction product is passed through the outside cooling apparatus where the heat of the polymerization reaction product is removed and then the polymerization reaction product is returned to the polymerization vessel.

However, in suspension polymerization particularly of vinyl chloride or a monomer mixture mainly made up of vinyl chloride (hereinafter referred to as a vinyl chloride type monomer), to place an internal structure, such as a cooling coil and a draft tube, in the polymerization vessel results in an increase in power required for agitation. That also causes the mixing performance of the charged materials to drop thereby allowing part of the flow in the polymerization vessel to slow down. As a result, the temperature in the polymerization vessel becomes nonuniform, so that the sizes of grains of the obtained polymer become nonuniform and further polymer scale is liable to be deposited on the inner wall of the polymerization vessel. The scale causes fish eyes to increase, which damages the quality of molded items considerably. Thus, to remove heat by such a means makes the structure in the polymerization vessel complicate and therefore leads to various problems.

Further, the method wherein a cooling apparatus is placed outside a polymerization vessel and a polymer mixture is circulated through that cooling apparatus requires, in addition to the management and maintenance of the polymerization vessel, the management and maintenance in the circulation line and makes such an operation as washing with water apt to be complicate. Further, the use of this outside circulation apparatus is attended with the problem that the quality of the obtainable polymer is inferior to the case wherein such an outside circulation apparatus is not used.

By the way, if the size of a polymerization vessel itself is made large in order to improve the productivity or if a polymerization method that can shorten the polymerization reaction time is adopted, the amount of generated heat per unit time increases and therefore it is required to increase the heat dissipation efficiency. For that purpose, it is possible to use a refrigeration machine to lower the temperature of cooling water to be flowed through a cooling jacket, but this is not preferable from an economical point of view.

Further, in the case of a large-sized polymerization vessel having a volume of 40 $m^3$ or more, since the increase in heat dissipation by a jacket has a limit itself, it becomes required to increase the amount of heat removed by a condenser. However, to increase the load of heat dissipation on the reflux condenser brings about an increase of foam of the slurry in the polymerization vessel to cause the slurry to overflow into the reflux condenser, and as a result the ability of the reflux condenser of removing heat is dropped or scale of the polymer happens to be deposited on the interior of the reflux condenser. In some cases, the pipeline is clogged with the overflowed polymer particles, making the operation of the reflux condenser not operable.

Further, the use of a reflux condenser from the initial stage of polymerization results in such problems that the particles of the obtained polymer are made coarse and that a frothy polymer is produced. Therefore, in the case wherein a large-sized polymerization vessel is used or the polymerization reaction time is shortened, the problem cannot be avoided that the heat dissipation only by a reflux condenser and a jacket becomes unsatisfactory. Therefore, the heat dissipation by the jacket and the reflux condenser has to be supplemented with other cooling system.

However, where, as a means of supplementing this insufficient heat dissipation, a cooling coil, a draft tube, an outside cooling apparatus, or the like is used to increase the heat transfer surface area for cooling, there is a problem that the quality of the obtained polymer is lowered or scale is formed.

SUMMARY OF THE INVENTION

Therefore, an object of the present invention is to provide a polymerization apparatus capable of producing a high-quality polymer that is high in heat dissipation efficiency, can allow the size of a polymerization vessel to be made large or allow the polymerization reaction time to be shortened without any difficulty, and hardly permits scale to be deposited.

According to the present invention, there is provided a polymerization apparatus comprising a polymerization vessel comprising a substantially cylindrical container, wherein said polymerization vessel has a plurality of baffles comprising pipes vertically extending in said polymerization vessel; and serpentine pipelines each of which is placed between two adjacent baffles and is extended in a repeated serpentine fashion along the polymerization vessel inner wall from the lower part to the upper part of the polymerization vessel with said serpentine pipeline apart from said inner wall; and a refrigerant is passed through said baffles and said serpentine pipelines.

The present invention provides, in a polymerization vessel, vertical baffles and serpentine pipelines extending in a repeated serpentine fashion from the lower part to the upper part of the polymerization vessel, and passes a refrigerant through the baffles and the serpentine pipelines, so that the present invention has succeeded to improve the heat dissipation efficiency remarkably and to obviate effectively formation of polymer scale and lowering of the quality of a polymer.

Thus, the present invention provides a method of producing a vinyl chloride type polymer comprising the step of subjecting vinyl chloride or a monomer mixture made up mainly of vinyl chloride to suspension polymerization in an aqueous medium by using the above polymerization apparatus.

According to the present invention, since effective cooling becomes possible, (1) even in the case of a polymerization reaction accompanied by generation of heat, a polymerization method wherein the polymerization reaction time is shortened considerably can be adopted readily and high productivity can be realized, (2) there is an advantage that it is not required to use refrigeration water or other refrigerant for cooling by a jacket of a polymerization vessel, (3) deposition of scale on a polymerization vessel inner wall or the like becomes little, and (4) a high-speed reaction particularly in a large-sized polymerization vessel becomes possible, a stable polymerization reaction can be carried out, and in comparison with the case wherein a polymerization apparatus having conventional flat plate baffles is used, a high-quality and uniform polymer that has few fish eyes and has a high bulk specific gravity can be obtained. These advantages of the present invention are remarkable in the case of a polymerization vessel having an internal volume of 40 $m^3$ or more, and particularly 80 $m^3$ or more.

DETAILED DESCRIPTION OF PREFERRED EMBODIMENTS

Figure 1:
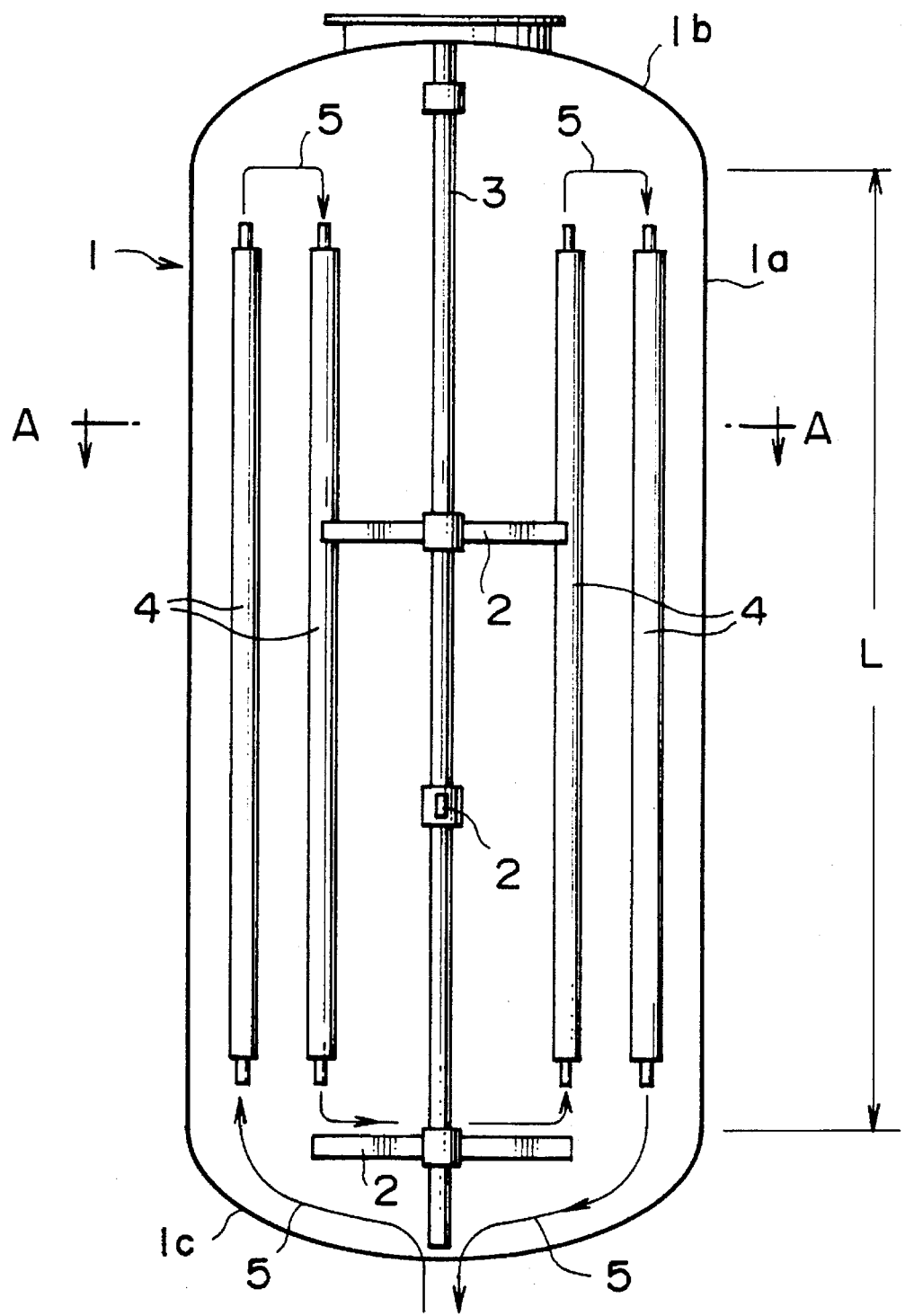
FIG. 1 is a diagram showing a simplified vertical section of the polymerization apparatus of the present invention, with the serpentine pipelines being omitted.

Now, the polymerization apparatus of the present invention will be described on the basis of embodiments shown in the accompanying drawings.

This polymerization apparatus is equipped with a polymerization vessel 1 comprising a vertically placed generally cylindrical side wall 1a and a top wall 1b and a bottom wall 1c that close the top and the bottom of the side wall 1a respectively and said polymerization vessel 1 has a cylindrical inner space. The polymerization vessel 1 has a reflux condenser at its upper part and a jacket outside thereof (now shown). In the inner space of the polymerization vessel 1, an agitating shaft 3 is placed along the axis of the polymerization vessel 1 and the agitating shaft 3 has paddles 2. Into this polymerization vessel 1, a polymerizable monomer, a polymerization initiator, an aqueous medium, a surface active agent, and so on are charged and the polymerization is carried out.

In the polymerization apparatus of the present invention, a plurality of vertical baffles 4 comprising cooling pipes are placed in the polymerization vessel 1. By passing a refrigerant through the baffles 4, the heat dissipation efficiency can be increased. Preferably the pipes for the baffles have a diameter of 40 to 500 mm, and particularly preferably 50 to 400 mm. Generally, it is desirable that the baffles 4 are about 2 to 8, and preferably about 4 to 6, in number, and are arranged around the axis symmetrically since by doing that a liquid will not stay and formation of scale can be obviated effectively. Further, preferably, in the horizontal section in FIG. 2, the total of the sectional areas of the baffles 4 ranges from 0.4 to 3% of the horizontal sectional area of the cylindrical section of the inner space of the polymerization vessel. If the number of the baffles 4 is one or the above rate of the sectional areas is smaller than 0.4%, the baffles cannot play their role and the vertical agitation in the polymerization vessel cannot be carried out satisfactorily. As a result, for example, in the case of suspension polymerization of a vinyl chloride type monomer, it disadvantageously occurs that the particle size distribution of the obtainable polymer becomes broad or fish eyes increase where the polymer is molded into a sheet. Further, if the number of the baffles 4 is increased to more than 8 or the rate of the above sectional areas is over 3%, not only the power required for agitation is increased excessively but also the flow behind the baffles (between the baffles and the inner wall surface of the polymerization vessel) becomes poor, and as a result deposition of scale is liable to occur. Further, desirably the baffles are placed 40 mm or more away from the inner wall.

Figure 2:
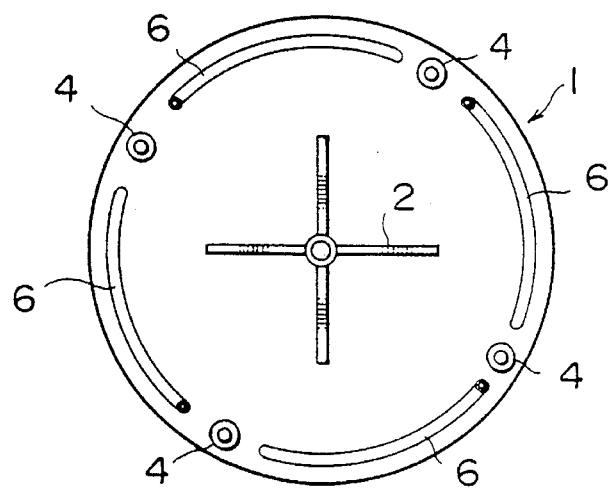
FIG. 2 is a horizontal sectional schematic view taken along the line A—A of the diagram of the apparatus shown in FIG. 1.
Figure 3:
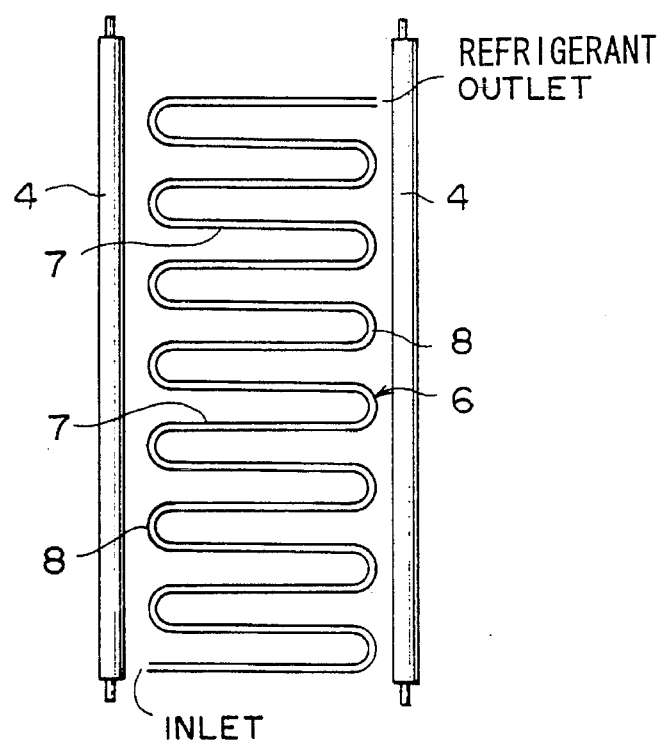
FIG. 3 is a diagram showing the arranged relationship between the serpentine pipeline and the baffles provided in the apparatus shown in FIG. 1.

Further, in the present invention, as shown in FIGS. 2 and 3, each serpentine pipeline 6 is placed between the adjacent baffles 4 to extend in a repeated serpentine fashion along the inner wall of the polymerization vessel 1 from the lower part to the upper part thereof. By passing a refrigerant through the serpentine pipelines, the heat dissipation effect is further increased. Preferably the serpentine pipeline has a diameter of 10 to 200 mm, and more preferably 20 to 100 mm. In FIG. 1, the serpentine pipelines 6 are omitted.

Generally, preferably the serpentine pipeline 6 has generally 2 to 30 turns, and particularly 5 to 20 turns although the number of turns varies depending, for example, on the size of the polymerization vessel 1 and the required heat transfer area. Further, preferably, as shown in FIG. 3, the serpentine pipeline 6 has horizontal sections 7 so that the flow of a polymer mixture in the polymerization vessel 1 may not be hampered as far as possible. Two horizontal sections 7 and 7 that are vertically adjacent are connected by a connecting section 8. Although there is no particular restriction on the shape of the connecting section 8, preferably the connecting section 8 is smooth arcuate in shape.

Figure 4:
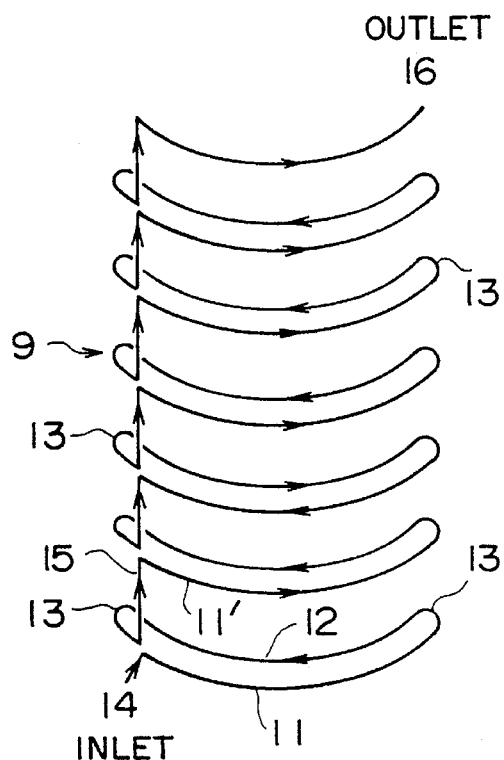
FIG. 4 is a diagram schematically showing another embodiment of the serpentine pipeline used in the present invention.
Figure 5:
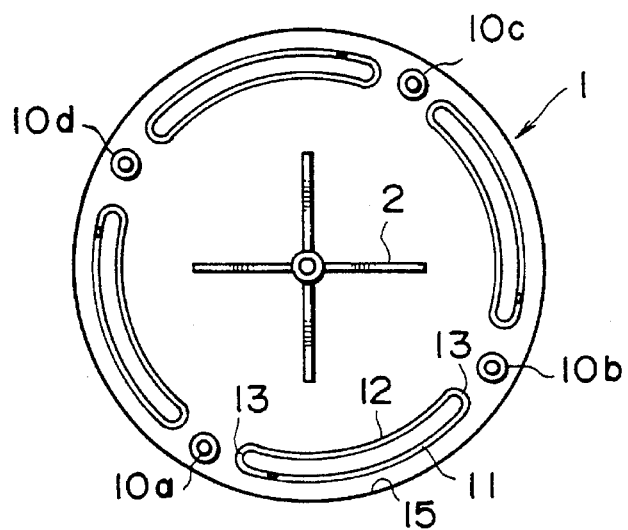
FIG. 5 is a horizontal cross sectional view with each serpentine pipeline placed between two adjacent baffles of four baffles in the polymerization vessel.

FIG. 4 is a schematic diagram showing another embodiment of the serpentine pipeline used in the present invention. FIG. 5 is a horizontal cross sectional view showing the serpentine pipelines 9 shown in FIG. 4 with each serpentine pipeline placed between two adjacent baffles (e.g., between the buffers 10a and 10b) of four baffles 10a to 10d. In this embodiment, the horizontal section of each stage is composed of an outer horizontal section 11 and an inner horizontal section 12 that are approximately in parallel with each other and on the same level and are connected by a smooth arcuate connecting section 13. That is, the serpentine pipeline 9 is extended from an inlet 14 for cooling water horizontally arcuately with a certain curvature along the polymerization vessel inner wall 15 to form the outer horizontal section 11, then is turned arcuately inwardly without reaching the baffle 10b to form the connecting section 13, then is extended in parallel with the outer horizontal section 11 horizontally arcuately with a smaller curvature to form the inner horizontal section 12, then is turned outwardly arcuately and horizontally, and then is turned vertically upwardly near a point, where the curvature is the same as that of the outer horizontal section, without reaching the baffle 10a. Then after the pipeline is extended by the length 15 corresponding to the clearance between the vertically adjacent two horizontal sections, the pipeline is extended in the same manner as that of the above outer horizontal section 11 along the polymerization vessel inner wall 15 to form the outer horizontal section 11'. Thereafter in a similar fashion the horizontal section of each stage is formed and the pipeline reaches an outlet 16.

Figure 6:
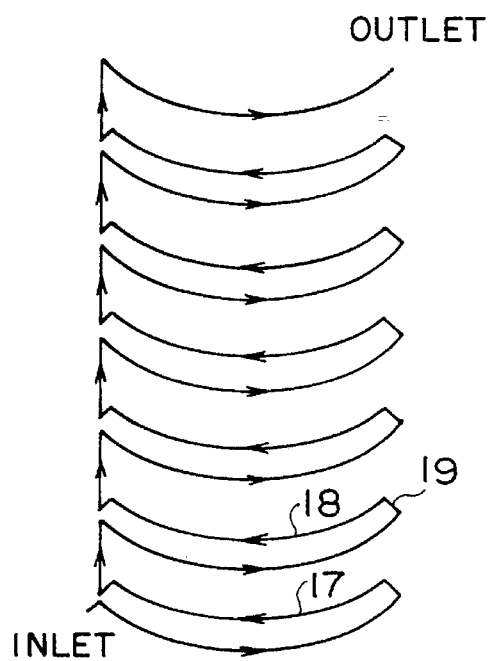
FIG. 6 is a view showing another embodiment of the serpentine pipeline.

FIG. 6 is a view showing another embodiment of the serpentine pipeline. In this embodiment, a connecting section 19 between an outer horizontal section 17 and an inner horizontal section 18 is composed of a linear pipeline.

Figure 7:
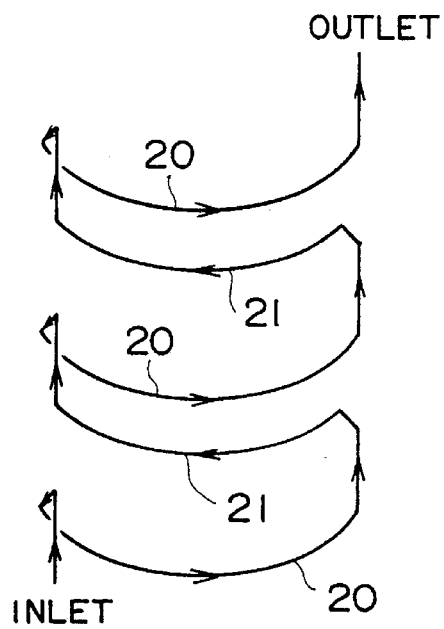
FIG. 7 is a view showing still another embodiment of the serpentine pipeline.

FIG. 7 is a view showing another embodiment of the serpentine pipeline. In this embodiment the levels of outer horizontal sections and inner horizontal sections are alternately changed. That is, the pipeline is extended from an inlet vertically upward, then is turned outwardly, and then is turned to form an outer horizontal section 20. Thereafter, the pipeline is extended vertically upward, is then turned inwardly, and is turned to form an inner horizontal section 21. After that, in a similar fashion, outer horizontal sections 20 and inner horizontal sections 21 that are on different levels are formed alternately.

The invention is described further with reference to the embodiments shown in FIGS. 1 to 3 again.

It is required that the above serpentine pipelines 6 are placed in such a manner that the flow of a polymer mixture is not hampered and that power more than needed will not be exerted on the agitating shaft 3 and the paddles 2. For example, preferably the serpentine pipelines 6 are arranged symmetrically around the axis of the polymerization vessel. It is desirable that the clearance between the serpentine pipelines 6 and the polymerization vessel inner wall is at least 40 mm. If the clearance is less than 40 mm, scale of a polymer is liable to be deposited between the polymerization vessel inner wall and the baffles 4 and between the polymerization vessel inner wall and the serpentine pipelines 6 at the gaseous phase/liquid phase interface part in the polymerization vessel 1. Further, preferably the clearance between the adjacent horizontal sections 7 and 7 of the serpentine pipeline 6 is at least 70 mm. If that clearance is less than 70 mm, scale of a polymer is liable to be deposited between the polymerization vessel inner wall and the serpentine pipeline 6.

In the present invention, desirably the above serpentine pipeline 6 is placed to be submerged in the liquid phase at the time of polymerization. At that time, it is desirable that the upper part of the serpentine pipeline is placed not to be too near the gas/liquid interface and is away from the gas/liquid interface as far as possible. This is because if the upper part of the serpentine pipeline is placed too near the gas/liquid interface, in the last stage of polymerization the gas/liquid interface is lowered fairly due to the reduction in volume of the liquid and therefore the upper part of the serpentine pipeline 6 is exposed to the gaseous phase, which is disadvantageous in view of the heat transfer performance and is apt to permit polymer scale to be deposited.

Although there is no particular restriction on the structure in the serpentine pipeline 6 and the baffles 4 described above, in order to improve the heat transfer performance at the time of heat dissipation through a refrigerant, a double-pipe structure can be used so that the refrigerant may be flowed between the inner pipe and the outer pipe to increase the lineal speed of the refrigerant. Preferably the lineal speed of the refrigerant is 1.0 to 3.0 m/s.

As the refrigerant, water, brine, Freon, or other liquefied gas is used, and in the case of a liquefied gas, it can be used while it is evaporated in the baffles 4 and the serpentine pipelines 6.

The direction of the flow of the refrigerant flowed in the baffles 4 and the serpentine pipelines 6 is not restricted, and, for example, for the baffles 4, it is desirable that the refrigerant is supplied continuously through one line as shown by the arrow 5 in FIG. 1. For the serpentine pipelines 6, preferably the refrigerant is flowed from the bottom to the top as shown in FIG. 3.

In the present invention, it is suitable that the polymerization vessel 1 having the baffles 4 and the serpentine pipelines 6 described above has such a structure that the L/D is in the range of 1.0 to 3.0, and particularly 1.5 to 2.5. Herein, L denotes the length of the cylindrical section as shown in FIG. 1 and D denotes the inner diameter of that cylindrical section. Preferably the polymerization vessel 1 is provided with a reflux condenser at the upper part thereof and a jacket outside thereof. Other than the paddles shown in the FIGS. 1 and 2, agitating blades of a type wherein driven flows are generated radially outwardly from the rotating shaft, such as turbine blades and Brumagin-type blades, are preferably used, and preferably these are used in multiple sets, and particularly in sets of two to six.

The rotational frequency and the like at the time of polymerization are suitably decided depending on the side of the polymerization vessel, the constitution of the means of removing heat, and the composition of the materials to be charged for polymerization. Preferably the energy of agitation to be applied to the contents (aqueous suspension mixture) is 80 to 200 kg·m/s·ton. Herein by "the agitation energy" to be applied to the contents is meant the net energy required for agitation per unit weight of the contents that is calculated by subtracting various energy losses [B], such as motor efficiency, transmission loss, and mechanical loss, from energy [A] (electrically measurable by a wattmeter) loaded by a driving motor for the agitator in operation in the polymerization vessel. That is, the agitation energy is represented by the formula:

$$\frac{[A] - [B]}{[C]} \text{ (kg · m/s · ton)}$$

wherein [C] represents the weight of the contents. The agitation energy can be easily adjusted by changing the rotational frequency of the agitating shaft.

Preferably the material used for these baffles and serpentine pipelines is a stainless steel, such as a high-chromium high-purity ferrite type stainless steel, a two-phase stainless steel, and an austenite type stainless steel in view of the heat transfer and corrosion resistance.

The polymerization apparatus of the present invention can be used widely for suspension polymerization and emulsion polymerization of various vinyl type monomers, such as olefins, e.g., ethylene and propylene, vinyl halides, e.g., vinyl chloride and vinylidene chloride, vinyl esters, e.g., vinyl acetate, vinyl ethers, e.g., ethyl vinyl ether, (meth-)acrylates, e.g., methyl methacrylate, esters or metal salts of maleic acid or fumaric acid, aromatic vinyls, e.g., styrene, diene monomers, e.g., butadiene, chloroprene, and isoprene, and acrylonitrile. The polymerization apparatus of the present invention is particularly suitable for polymerization of vinyl chloride or a monomer mixture mainly made up of vinyl chloride.

In the polymerization of these, the ratio of the raw materials to be charged, the method of charging, and the polymerization conditions including the polymerization temperature and the like are basically the same as those used generally.

Where polymerization is carried out by using the above polymerization apparatus, the time at which cooling water is passed through the baffles, the serpentine pipelines, and the jacket to start the heat dissipation of the charged reaction mixture is preferably at the time when the temperature of the reaction mixture has reached the desired polymerization temperature. Further the time at which the dissipation of heat by the reflux condenser is started is preferably after the polymerization conversion has reached 4%, and more preferably at the time when the polymerization conversion is 4 to 20%.

For example, in the case of suspension polymerization of a vinyl chloride type monomer, the charging of an aqueous medium, vinyl chloride monomer, optionally other comonomer, a dispersion assistant, a polymerization initiator and the like into the polymerization vessel can be carried out in the same manner as the conventional manner and the polymerization conditions may also be the same as the conventional conditions. As the monomer to be polymerized, vinyl chloride can be used singly as well as a monomer mixture mainly made up of vinyl chloride (in an amount of 50% by weight or more) can be used. The comonomer that will be copolymerized with the vinyl chloride includes, for example, a vinyl ester, such as vinyl acetate and vinyl propionate; an acrylate or a methacrylate, such as methyl acrylate and ethyl acrylate; an olefin, such as ethylene and propylene; maleic anhydride; acrylonitrile, styrene; vinylidene chloride; and other monomer copolymerizable with vinyl chloride.

The above dispersion assistant may be a dispersion assistant usually used in polymerization of vinyl chloride in an aqueous medium and includes, for example, a water-soluble cellulose ether, such as methyl cellulose, hydroxyethyl cellulose, hydroxypropyl cellulose, and hydroxypropyl methyl cellulose; a partially saponified polyvinyl alcohol and an acrylic polymer; and a water-soluble polymer, such as gelatin, which may be added singly or as a combination of two or more. The dispersion assistant is added in an amount of 0.01 to 5 parts by weight per 100 parts by weight of the monomer to be charged.

The polymerization initiator may also be a polymerization initiator conventionally used in polymerization of vinyl chlorides and includes, for example, a percarbonate, such as diisopropyl peroxydicarbonate, di-2-ethylhexyl peroxydicarbonate, and diethoxyethyl peroxydicarbonate; a perester compound, such as α-cumyl peroxyneodecanate, t-butyl peroxyneodecanate, t-butyl peroxyneoheptanoate, hexyl peroxyneodecanate, and octyl peroxyneodecanate; a peroxide, such as acetylcyclohexylsulfonyl peroxide, and 2,4,4-trimethylpentyl-2-peroxyphenoxy acetate; and an azo compound, such as azobis-2,4-dimethylvaleronitrile and azobis(4-methoxy-2,4-dimethylvaleronitrile), which may be used singly or as a combination of two or more. These polymerization initiators are added generally in an amount of 0.01 to 3 parts by weight, and preferably 0.05 to 3 parts by weight, per 100 parts by weight of the monomer.

If required, for example, a polymerization regulator, a chain transfer agent, a pH adjustor, a gelling improver, an antistatic agent, and an anti-scaling agent that are suitably used in polymerization of vinyl chloride can be added.

EXAMPLES

Example 1

The polymerization apparatus shown in FIGS. 1 to 3 was used.

The polymerization vessel 1 has an internal volume of 2 $m^3$ and the horizontal sectional area of the inner space of the cylindrical section is 0.865 $m^2$. The blade length of the paddles 2 attached to the agitating shaft 3 placed at the center of the polymerization vessel 1 is 517 mm. The polymerization vessel 1 is provided with a reflux condenser at the upper part thereof and a jacket outside thereof as cooling means although they are not shown.

The baffles 4 comprise four baffles of cylindrical pipes of an austenite stainless steel having an outer diameter of 60.5 mm and an inner diameter of 52.7 mm, which are equi-spaced and arranged in a point symmetrical fashion at positions where they do not interfere with the rotation of the paddles (at positions 455 mm away from the center of the polymerization vessel). The total of the horizontal sectional areas of the four baffles is 0.01149 $m^2$.

The serpentine pipelines 6 comprise pipelines of an austenite stainless steel having an outer diameter of 27.2 mm and an inner diameter of 23 mm and each of the serpentine pipelines 6 is placed between two adjacent baffles 4 as shown in FIGS. 2 and 3, i.e., the number of the serpentine pipelines is four in all. The number of the horizontal sections of the serpentine pipeline 6 is 15, the clearance between the polymerization vessel inner wall and the serpentine pipeline 6 is 50 mm, and the clearance between the horizontal sections of the serpentine pipeline is 90 mm. When required, cooling water can be flowed through the baffles and the serpentine pipelines and the flow rate can be controlled.

Into this polymerization vessel, 900 kg of deionized water, 330 g of partially saponified polyvinyl alcohol, and 429 g of di-2-ethylhexyl peroxydicarbonate were charged and after the inside of the polymerization vessel was evacuated to 50 mmHg, 660 kg of vinyl chloride monomer was charged, and hot water was passed into the jacket while the resulting mixture was agitated by rotating the paddles 2 at a rotational frequency of 208 rpm, so that the internal temperature was elevated to 57° C. to start the polymerization. When the internal temperature reached 57° C., cooling water was flowed through the baffles, the serpentine pipelines, and the jacket to keep the internal temperature at 57° C. to continue the polymerization reaction. When the polymerization conversion reached 5%, the operation of the reflux condenser was started and the polymerization was continued. After 1 hour after the start of the polymerization, the agitation power was measured. After the pressure in the polymerization vessel dropped to 6.5 kg/$cm^2$ (Gauge), the reaction was stopped (the polymerization time was 4.5 hours).

Thereafter, the unreacted monomer was recovered, and the produced vinyl chloride polymer slurry was withdrawn from the polymerization vessel, was dehydrated, and was dried to obtain the desired vinyl chloride polymer. The bulk specific gravity, the plasticizer take-up, the particle size distribution, and fish eyes of the obtained polymer were measured in the following manner and the state of the deposition of scale on the polymerization vessel inner wall was observed. The results are shown in Table 1.

The maximum heat dissipation capacity of the jacket and the reflux condenser attached to the polymerization vessel 1 are:

Jacket maximum heat dissipation capacity: 40×$10^3$ kcal/H

Reflux condenser maximum heat dissipation capacity: 30×$10^3$ kcal/H

In the above polymerization, the jacket and the reflux condenser were operated under the following conditions:

The jacket heat dissipation capacity: $30 \times 10^3$ kcal/H

The reflux condenser heat dissipation capacity: $25 \times 10^3$ kcal/H

The maximum heat dissipation capacity of the baffles and the serpentine pipelines was as follows:

The total maximum heat dissipation capacity of the four baffles: $12 \times 10^3$ kcal/H The total maximum heat dissipation capacity of the four serpentine pipelines: $16 \times 10^3$ kcal/H The maximum amount of heat of polymerization reaction at the peak (polymerization conversion: about 70%) was $70 \times 10^3$ kcal/H.

Bulk specific gravity

The bulk specific gravity was measured in accordance with JIS K-6721.

Plasticizer take-up

Glass fiber was filled into the bottom of an aluminum alloy container having an inner diameter of 25 mm and a depth of 85 mm and a 10-g sample of the vinyl chloride polymer was taken and placed into the container. 15 cc of dioctylphthalate (DOP) was added thereto and the container was allowed to stand for 30 min to cause the DOP permeate the polymer well. Thereafter, the excess DOP was centrifuged under an acceleration of 1,500 G and the amount of DOP taken up by the 10 g of the polymer was measured. The plasticizer take-up was expressed per 100 g of the polymer.

Particle size distribution

The polymer was sifted through sieves #60, #80, #100, #150, and #200 in accordance with JIS Z-8801 and the passed amounts (% by weight) were measured.

Fish eyes 100 parts by weight of the vinyl chloride polymer, 50 parts by weight of dioctyl phthalate, 0.5 part by weight of lead trihydroxysulfate, 1.5 parts by weight of lead stearate, 0.1 part by weight of titanium oxide, and 0.05 part by weight of carbon black were mixed and 25 g of the resulting mixture was kneaded by a 6-inch kneading roll at 140° C. for 5 min and was formed into a sheet having a width of 15 cm and a thickness of 0.2 mm.

The number of transparent particles formed in the obtained sheet per 100 cm$^2$ was counted.

Comparative Example 1

Example 1 was repeated, except that in the polymerization vessel the serpentine pipelines were not placed, the number of the baffles was changed from four to 10, and the baffles were arranged in a point-symmetrical fashion in relation to the shaft 3, thereby obtaining a vinyl chloride polymer. The same measurement as made in Example 1 was carried out. The results are shown in Table 1.

Comparative Example 2

Example 1 was repeated, except that in the polymerization vessel the baffles were not placed, thereby obtaining a vinyl chloride polymer. The same measurement as made in Example 1 was carried out. The results are shown in Table 1.

Example 2

The polymerization apparatus shown in FIGS. 1 and 2 was used.

The polymerization vessel has an internal volume of 80 m$^3$ and the internal horizontal sectional area of the cylindrical section of the vessel is 10.2 m$^2$. The length of the paddles 2 attached to the agitating shaft 3 positioned at the center of the polymerization vessel 1 is 1,775 mm. Although not shown, as cooling means, a reflux condenser is provided at the upper part of the polymerization vessel 1 and a jacket is provided around the side surface of the polymerization vessel 1.

The maximum heat dissipation capacity of the jacket and the reflux condenser are:

Jacket maximum heat dissipation capacity: $1.18 \times 10^6$ kcal/H

Reflux condenser maximum heat dissipation capacity: $1.0 \times 10^6$ kcal/H

The baffles 4 comprises four baffles of cylindrical pipes of an austenite stainless steel having an outer diameter of 190 mm and an inner diameter of 178 mm, which are equi-spaced and arranged in a point-symmetrical fashion in relation to the shaft 3 at positions where they do not interfere with the rotation of the paddles (at positions 1,565 mm away from the center of the polymerization vessel).

The serpentine pipelines 6 comprise pipelines of an austenite stainless steel having an outer diameter of 60 mm and an inner diameter of 52 mm and each of the serpentine pipelines 6 is placed between two adjacent baffles 4 as shown in FIGS. 2 and 3, i.e., the number of the serpentine pipelines is four in all. The number of the horizontal sections of the serpentine pipeline 6 is 15, the clearance between the polymerization vessel inner wall and the serpentine pipeline 6 is 200 mm, and the clearance between adjacent horizontal sections of the serpentine pipeline is 350 mm. When required, cooling water can be flowed through the baffles and the serpentine pipelines and the flow rate can be controlled.

The maximum heat dissipation capacity of the baffles and the serpentine pipelines was as follows:

The total maximum heat dissipation capacity of the four baffles: $0.45 \times 10^6$ kcal/H The total maximum heat dissipation capacity of the four serpentine pipelines: $0.5 \times 10^6$ kcal/H Into this polymerization vessel, 38.2 t of deionized water, 14 kg of partially saponified polyvinyl alcohol, and 18.2 kg of di-2-ethylhexyl peroxydicarbonate were charged and after the inside of the polymerization vessel was evacuated to 50 mmHg, 28 t of vinyl chloride monomer was charged, and hot water was passed through the jacket while the resulting mixture was agitated, so that the internal temperature was elevated to 57° C. to start the polymerization. When the internal temperature reached 57° C., cooling water was flowed through the baffles, the serpentine pipelines, and the jacket to keep the internal temperature at 57° C. to continue the polymerization reaction. When the polymerization conversion reached 5%, the operation of the reflux condenser was started and the polymerization was continued.

After the pressure in the polymerization vessel dropped to 6.5 kg/cm$^2$ (Gauge), the reaction was stopped (the polymerization time was 4 hours).

Thereafter, the unreacted monomer was recovered, and the produced vinyl chloride polymer slurry was dehydrated, and was dried to obtain the desired vinyl chloride polymer. The bulk specific gravity, the plasticizer take-up, the particle size distribution, and fish eyes of the obtained polymer were measured in the same way as in Example 1 and the state of the deposition of scale on the polymerization vessel inner wall was observed. The results are shown in Table 1. The maximum amount of heat of polymerization reaction at the peak (polymerization conversion: about 70%) was $3.03 \times 10^6$ kcal/H.

Comparative Example 3

Example 1 was repeated, except that, in the polymerization vessel, flat plate baffles of an austenite stainless steel having a width of 40 mm, a thickness of 5 mm, and a length of 1,300 mm (having no cooling function) were placed in place of the baffles 4 and the serpentine pipelines 6, thereby obtaining a vinyl chloride polymer. The same measurement as made in Example 1 was carried out. The results are shown in Table 1. In this Comparative Example, the polymerization apparatus was operated with the maximum heat dissipation capacity of the jacket being $40 \times 10^3$ kcal/H and the capacity of the reflux condenser being $30 \times 10^3$ kcal/H.

Example 3

Example 1 was repeated, except that in place of the serpentine pipelines shown in FIG. 3, serpentine pipelines having the structure shown in FIG. 7 with each serpentine pipeline placed between adjacent baffles of the four baffles were used, thereby polymerizing vinyl chloride. The serpentine pipes 9 comprise pipelines of an austenite stainless steel having an outer diameter of 27.2 mm and an inner diameter of 23 mm. The total number of the horizontal sections 20 and 21 of the serpentine pipeline 6 is 15, the clearance between the inner horizontal section 21 and the outer horizontal section 20 that are adjacent is 103 mm and the clearance between the outer horizontal sections 20 and the polymerization vessel inner wall 15 is 50 mm. The clearance between the two vertically adjacent outer horizontal sections and the clearance between the two vertically adjacent inner horizontal sections were both 180 mm. The maximum heat dissipation capacity of the used four serpentine pipelines was $13 \times 10^3$ kcal/H.

What is claimed is:

1. A method of producing a vinyl chloride polymer comprising the step of subjecting vinyl chloride or a monomer mixture containing vinyl chloride in an amount of 50% by weight or more to suspension polymerization in an aqueous medium by using a polymerization apparatus equipped with a polymerization vessel comprising a substantially cylindrical container, wherein said polymerization vessel has a plurality of baffles each having a cooling function comprised of pipes vertically extending in said polymerization vessel; and serpentine pipelines each of which is placed between two adjacent baffles and is extended in a repeated serpentine fashion along the polymerization vessel inner wall from the lower part to the upper part of the polymerization vessel with said serpentine pipeline apart from said inner wall; and a refrigerant is passed through said baffles and said serpentine pipelines.

2. The method of claim 1, wherein said baffles having a cooling function are two to eight in number and are arranged symmetrically about the axis of said polymerization vessel.

3. The method of claim 1, wherein the total of the sectional areas of said baffles ranges from 0.4 to 3% of the horizontal sectional area of the cylindrical section constituting the space in the polymerization vessel.

4. The method of claim 1, wherein each of said serpentine pipelines has 2 to 30 turns.

5. The method of claim 1, wherein the plurality of said serpentine pipelines are arranged symmetrically around the axis of the polymerization vessel.

6. The method of claim 1, wherein said serpentine pipelines are placed 40 mm or more away from said polymerization vessel inner wall.

TABLE 1

|  | Example 1 | Comparative Example 1 | Comparative Example 2 | Example 2 | Comparative Example 3 | Example 3 |
|---|---|---|---|---|---|---|
| Bulk specific gravity | 0.545 | 0.540 | 0.540 | 0.546 | 0.540 | 0.545 |
| Plasticizer take-up | 25.3 g | 24.9 g | 21.9 g | 25.2 g | 24.0 g | 25.1 g |
| Distibution of amounts passed through sieves (%) |  |  |  |  |  |  |
| #60 pass | 100 | 99.0 | 81.2 | 100 | 100 | 100 |
| #100 pass | 35.6 | 25.8 | 15.4 | 36.2 | 35.1 | 35.8 |
| #200 pass | 0.2 | 1.0 | 0.0 | 0.2 | 0.3 | 0.2 |
| Fish eyes | 5 | 7 | 1000 or more | 4 | 10 | 4 |
| State of deposition of scale | Little scale | Deposition of scale at the liquid phase/gas phase interface section in the polymerization vessel was observed. | There was deposition of scale at the liquid phase/gas phase interface section in the polymerization vessel. There were a number of glassy beads. | Little scale | There was deposition of scale on the baffles on the polymerization vessel side and at the liquid phase/gas phase interface section in the polymerization vessel. | Little scale |
| Rotational frequency of the agitating blades during the polymerization | 208 | 208 | 208 | 99 | 208 | 208 |
| Agitation power after 1 hour after the start of polymerization (kg · m/s · ton) | 120 | 160 | 80 | 125 | 120 | 123 |

7. The method of claim 1, wherein the clearance between adjacent horizontal sections of each of said serpentine pipelines is 70 mm or more.

8. The method of claim 1, wherein said pipe of said baffle and said serpentine pipeline have a double-pipe structure and the refrigerant is passed between the inner pipe and the outer pipe of said pipe of said baffle and said serpentine pipeline.

9. The method of claim 1, wherein the refrigerant is passed through said baffle and said serpentine pipeline at 1.0 to 3.0 m/sec.

10. The method of claim 1, wherein said refrigerant is water, brine, or a liquefied gas.

* * * * *